March 26, 1935.   J. HEKTNER   1,995,851
LOCOMOTIVE RUNNING GEAR
Filed Jan. 15, 1934    3 Sheets-Sheet 1
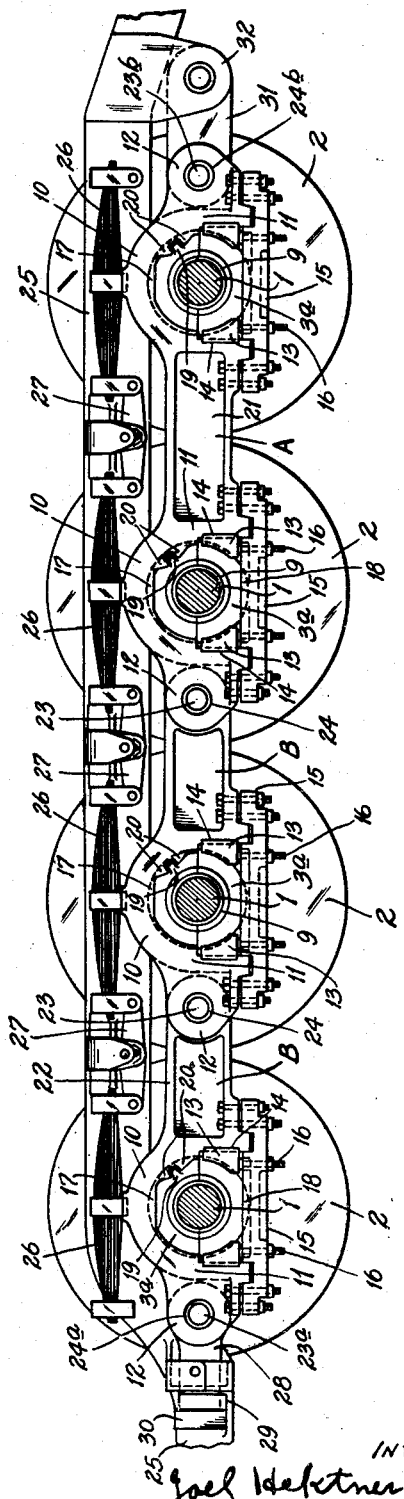
INVENTOR:
Joel Hektner,
by Cowan & Gravely,
HIS ATTORNEYS.

March 26, 1935.  J. HEKTNER  1,995,851
LOCOMOTIVE RUNNING GEAR
Filed Jan. 15, 1934  3 Sheets-Sheet 2
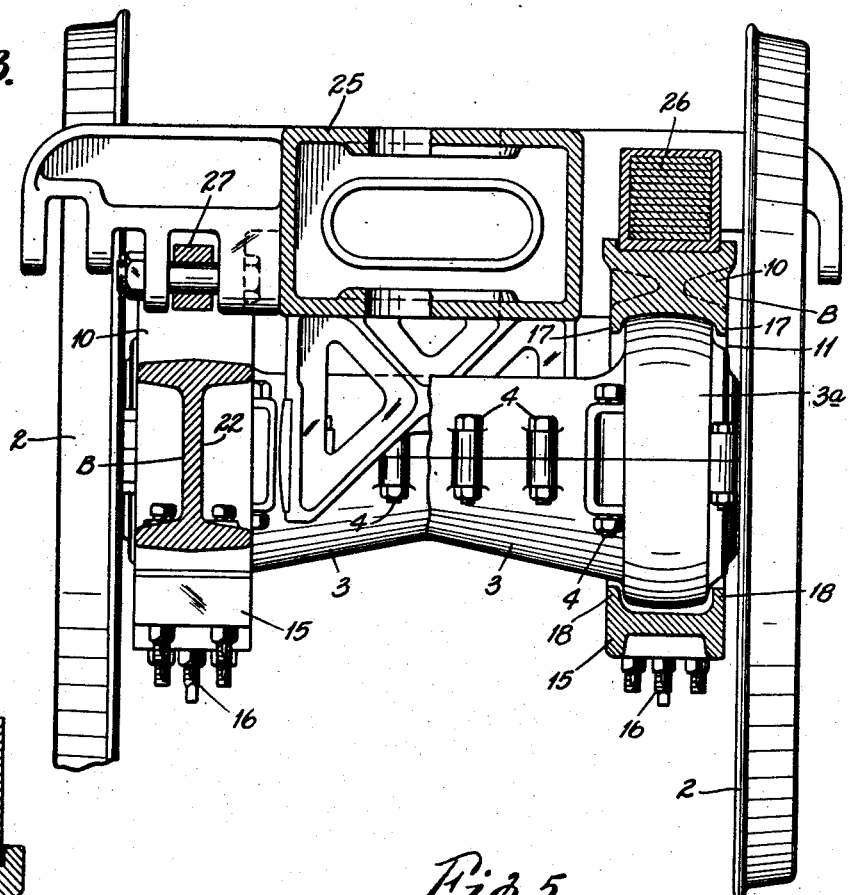
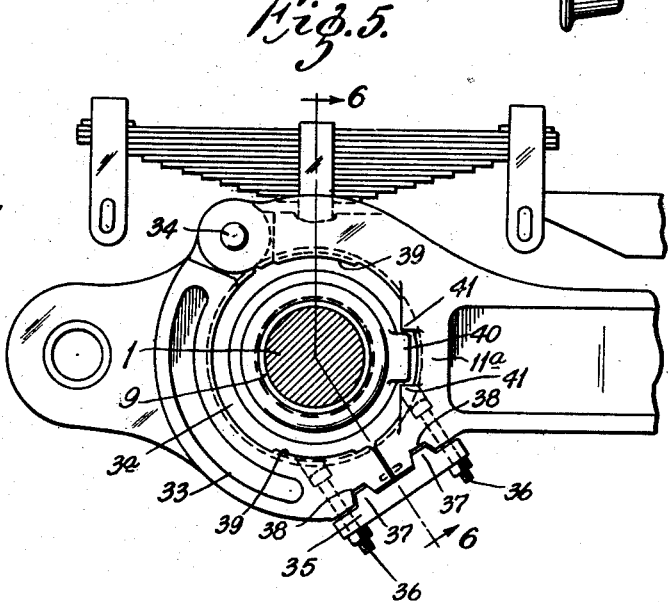
INVENTOR:
Joel Hektner
by Can Van Gravely,
HIS ATTORNEYS.

March 26, 1935. J. HEKTNER 1,995,851
LOCOMOTIVE RUNNING GEAR
Filed Jan. 15, 1934 3 Sheets-Sheet 3
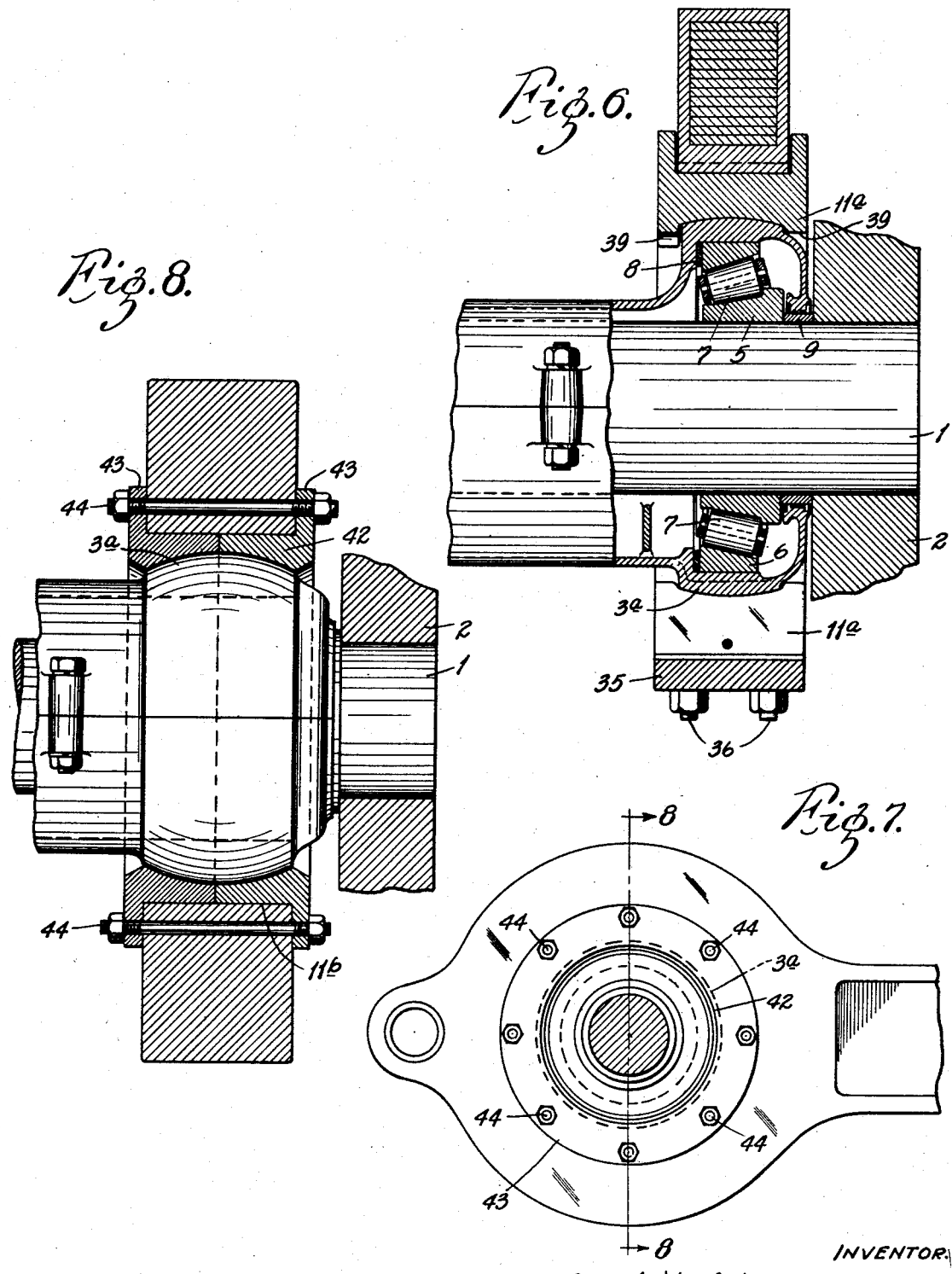
INVENTOR
Joel Hektner
by Cantlan & Gravely
HIS ATTORNEYS.

Patented Mar. 26, 1935

1,995,851

UNITED STATES PATENT OFFICE 1,995,851

LOCOMOTIVE RUNNING GEAR

Joel Hektner, Canton, Ohio, assignor to The Timken Roller Bearing Company, Canton, Ohio, a corporation of Ohio Application January 15, 1934, Serial No. 706,584

12 Claims. (Cl. 105—79)

This invention relates to locomotive running gears of the type wherein the axles have their ends journaled in driving boxes that are linked together and to the main frame of the locomotive. The invention has for its principal objects to provide each axle with a single driving box that extends substantially from wheel to wheel and thus dispenses with the two end driving boxes heretofore employed; to provide said single driving box with roller bearings that are located in the ends of the box close to the wheels; to provide for universal movement between the boxes and the links at the ends thereof; to facilitate assembly and disassembly of the boxes and links; and to provide for simplicity and cheapness of construction and compactness of design.

The invention consists principally in providing the axles with single driving boxes that extend substantially from wheel to wheel thereof and are provided with enlarged ends that contain roller bearings and have universal joint connections with the links that connect said boxes together. The invention also consists in the construction, combination and arrangement of parts hereinafter described and claimed.

In the accompanying drawings, which form part of this specification and wherein like symbols refer to like parts wherever they occur, Fig. 1 is a plan view of a locomotive main frame, provided with a running gear embodying my invention, Fig. 2 is a side elevation of the same with the wheels on the near side of the frame removed from the axles, Fig. 3 is a vertical transverse section on the line 3—3 in Fig. 1, Fig. 4 is a vertical section on the line 4—4 in Fig. 2, Fig. 5 is an end view of one of the driving boxes showing a modified arrangement for securing the link to the end of said drive box, Fig. 6 is a section on the line 6—6 in Fig. 5, Fig. 7 is a view similar to Fig. 5 showing a further modification, and Fig. 8 is a section on the line 8—8 in Fig. 7.

Referring to the accompanying drawings, my locomotive running gear comprises a plurality of spaced parallel axles 1, each provided at its ends with wheels 2 and intermediate said wheels with a single, longitudinally split enclosing housing or driving box 3. This single driving box extends substantially from wheel to wheel of its supporting axle with its half sections held together by bolts 4 that extend through cooperating lugs on said sections. The driving box 3 has enlarged end portions 3a within which are located suitable antifriction bearings, preferably tapered roller bearings. Each of said tapered roller bearings comprises a cone 5 mounted on the axle 1 close to the hub of the wheel 2, a cup 6 mounted in the enlarged end portion 3a of the driving box and a series of conical bearing rollers 7 interposed between said cup and said cone. The tapered roller bearing may be adjusted by means of a washer 8 of proper thickness interposed between the large end of the cup 6 and an annular shoulder formed by the end wall of the enlarged end portion 3a of the driving box 3. A spacer sleeve 9 is mounted on the axle 1 between the hub of the wheel 2 and the large end of the bearing cone 5; and the end of the driving box is closed by means of an end wall having an opening which snugly fits said spacer sleeve.

At their corresponding ends, the driving boxes 3 are connected together by links of two types, the forward pair of axles being connected together by links of the type A, the rear pair of axles being connected together by links of the type B and the adjacent axles of the two pairs being connected together by links of the two types. Each type of link is provided adjacent to at least one end thereof with an enlarged portion 10 provided with an inverted U-shaped opening or notch forming a downwardly opening jaw 11 adapted to straddle the enlarged end 3a of a driving box; and at least one end of each type of link is provided with a pair of horizontally spaced lugs or ears 12 that project from one side of said enlarged portion 10.

The enlarged end portion 3a of each driving box is provided with a convex peripheral surface; and the arcuate upper surface of the jaw 11 of each link is provided with a concave spherical surface adapted to cooperate with the convex spherical surface of said driving box. Each box receiving jaw 11 of a link is widened below the spherical upper end portion thereof to form vertical slideways for wedge members or blocks 13 that have concave spherical surfaces adapted to engage the convex spherical surface of the driving box. These wedge blocks are provided with vertical side flanges 14 that overlap the opposite side faces of the link and thus permit movement of said blocks crosswise of said link. Each jaw 11 is closed at the bottom by means of a tie bar 15 whose ends are bolted or otherwise removably secured to the bottom of the link. The wedge blocks 14 are held in engagement with the spherical end 3a of the axle housing by means of bolts 16 that pass vertically through the tie bars 15 with their upper ends in abutting relation to the bottoms of said wedges.

The spherical ends of the driving boxes are prevented from being pulled endwise out of the jaws 11 of the links by lugs 17 at the upper ends of said jaw and by upstanding side flanges 18 on the tie bars 15. Relative rotary movement of each link and the driving box cooperating therewith is limited by means of a lug 19, which is formed on the inner wall of the enlarged portion 3a of said box and fits loosely between a pair of circumferentially spaced lugs 20 that project inwardly from the jaw 11 in said link.

Each link of the type A is provided at both ends with lugs 12 and with jaw containing portions 10 connected by an integral portion 21; while each link of the type B has lugs 12 and a jaw containing portion 10 at one end only, the remaining portion of said link being in the form of a radial arm 22. The arm 22 of the rearmost link B extends between the horizontally spaced ears or lugs 12 of the other link B and is pivoted thereto by means of a pin 23 and spherical or crowned bushing 24. The arm of said other link B is pivotally connected to the rearwardly extending lugs 12 of the adjacent link A by means of similar pin and spherical bushing.

The main frame 25 of the locomotive is supported on the links A and B through the usual spring rigging which includes springs 26 seated on the tops of the enlarged box receiving portions 10 of said links and equalizing levers 27 pivoted to said main frame and with their ends shackled to the adjacent ends of said springs. The rearmost links B are connected to the main frame by means of links 28 whose forward ends are secured by means of pins 23a and spherical bushings 24a to the rearwardly extending lugs or ears 12 of said links B. The links 28 extend rearwardly through openings provided therefor in brackets 29 that project laterally from the main frame 25 and terminate at their rear ends in head portions 30 located rearwardly of said brackets. The front links A are connected to the main frame 25 by means of links 31 whose rear ends are connected to the forward lugs 12 of the links A by means of pins 23b and spherical bushings 24b and whose forward ends are connected by similar pins or bushings to lugs 32 that depend from said main frame.

In the modified link construction shown in Figs. 5 and 6 the box receiving jaw 11a is provided with a hinged section 33 to facilitate mounting and dismounting of the link on the large spherical end portion of said box. The movable section 33 of this jaw is secured to the rigid section thereof by means of a suitable hinge pin 34; and the free end of said section is secured to said rigid section by means of a tie bar 35 that spans the jaw between said jaw sections and is removably secured in position by bolts 36. The tie bar and jaw sections are preferably provided with cooperating lugs and recesses 37 and 38 respectively, having inclined faces that operate to draw the jaw sections together when the bolts 36 are tightened. The axle receiving opening or jaw 11a is provided at its top and bottom with inwardly extending lugs 39 that prevent the box from pulling out of said jaw. Relative rotary movement of the box and link is limited by means of a lug 40 on the box which fits loosely between spaced lugs 41 in said jaw.

In the modified link construction shown in Figs. 7 and 8, the link has a cylindrical opening 11b adapted to receive a sleeve 42 having outstanding end flanges 43 that overlap and are secured to the opposite sides of the link by horizontal through bolts 44. The inner face of the sleeve is provided with a concave spherical surface adapted to cooperate with the convex spherical end 3a of the driving box; and said sleeve is split transversely intermediate its ends to permit its assembly in and disassembly from the opening 11b provided therefor in said link.

By the arrangement described, the box connecting links maintain a proper spacing of the axles and serve to transmit the driving force from one axle to another; and the universal joint connections formed by the cooperating spherical portions of the boxes and links provide sufficient flexibility to permit the axles to move vertically and endwise relative to each other and to tilt endwise without straining the links. The long driving box dispenses with the use of two separate driving boxes for said axle, provides a larger space for oil and more space for the roller bearings. The location of the bearings in the ends of the boxes close to the wheels greatly reduces the distance between the bearings and the side rods of the locomotive and thus reduces to a minimum the bearing load and the axle stresses. The jaws of the links are formed in enlarged portions thereof that are strong enough to take care of the alternate tension and compression stresses therein and to also prevent any of the boxes from being pulled out of round and thus cause bearing failure.

It is noted that by the arrangement described, a proper spacing of the axles is maintained regardless of uneven track conditions, thereby preventing overstraining of the side rods, side rod bushings, crank pins, axles and bearings. It is also noted that the spherical joints between the ends of the axle housing and links enable a very close adjustment to be obtained therebetween, thereby practically eliminating the destructive pounding due to looseness in such joints. It is also noted that the boxes may be provided with plain bearings instead of the roller bearings shown and described.

Obviously the hereinbefore described construction admits of considerable modification without departing from the invention. Therefore, I do not wish to be limited to the precise construction shown and described.

What I claim is:

1. A locomotive running gear comprising a plurality of wheeled axles, driving boxes on said axles, links connecting said driving boxes said links having openings therein adapted to receive said boxes, the cooperating portions of said boxes and said openings being provided with spherical surfaces, and means on said boxes cooperating with means on said links for limiting relative rotary movement thereof.

2. A locomotive running gear comprising a plurality of axles, driving boxes on said axles and extending substantially from wheel to wheel thereof, and links extending between driving boxes at opposite ends thereof, each of said links having an opening adapted to receive the adjacent end of a driving box, said opening and the portion of the driving box disposed therein being provided with cooperating spherical surfaces.

3. A locomotive running gear comprising a plurality of axles, driving boxes on said axles and extending substantially from wheel to wheel thereof, and links extending between driving boxes at opposite ends thereof, each of said links having an opening adapted to receive the adjacent end of a driving box, said opening and the portion of the driving box disposed therein being provided with cooperating spherical surfaces, said link having a removable section forming a portion of its box receiving opening.

4. A locomotive running gear comprising a plurality of axles, driving boxes mounted on said axles and extending substantially from wheel to wheel thereof, each of said boxes having an enlarged end portion, roller bearings interposed between the enlarged end portions of said box and the axle therein, and links connecting said boxes, each of said links having an opening adapted to receive an enlarged end portion of a box, the cooperating portions of said opening and said enlarged end portion of said box being provided with cooperating spherical surfaces.

5. A locomotive running gear comprising a plurality of wheeled axles, driving boxes enclosing said axles between the wheels thereon, links connecting the corresponding ends of said boxes, each of said links being provided with a jaw adapted to straddle an end of a driving box, means for closing the open end of said jaw, and wedges mounted in said jaw on opposite sides of said box, the jaw engaging portion of said box being provided with a convex spherical portion, and the box engaging surfaces of said jaw and said wedges being provided with spherical seats for the spherical portion of said box.

6. A locomotive running gear comprising a plurality of wheeled axles, driving boxes enclosing said axles between the wheels thereon, links connecting the corresponding ends of said boxes, each of said links being provided with a jaw adapted to straddle an end of a driving box, means for closing the open end of said jaw, wedges mounted in said jaw on opposite sides of said box, the jaw engaging portion of said box being provided with a convex spherical portion, the box engaging surfaces of said jaw and said wedges being provided with spherical seats for the spherical portion of said box, and means for adjusting said wedges relative to said box.

7. A locomotive running gear comprising a pair of wheeled axles, single driving boxes enclosing said axles between the wheels thereon, and links mounted on the ends of the respective boxes, the cooperating portions of said links and said boxes being provided with spherical surfaces, the link of one box being pivotally connected to the link of an adjacent box.

8. A locomotive running gear comprising a pair of wheeled axles, single driving boxes surrounding said axles intermediate the wheels thereon, and links connecting the corresponding ends of said boxes, said links comprising enlarged end portions provided with openings adapted to receive the ends of said boxes, said boxes and said openings being provided with cooperating spherical surfaces, and said links being provided at their ends with portions adapted to cooperate with other links.

9. A locomotive running gear comprising wheeled axles, driving boxes surrounding said axles between the wheels thereon, links connecting the corresponding ends of said boxes, said links having openings therein adapted to receive said boxes, and a sleeve removably mounted in the opening in each link and surrounding the box therein, the cooperating portions of said sleeve and said box being provided with spherical surfaces.

10. A locomotive running gear comprising wheeled axles, driving boxes surrounding said axles between the wheels thereon, links connecting the corresponding ends of said boxes, said links having openings therein adapted to receive said boxes, and a sleeve removably mounted in the opening in each link and surrounding the box therein, the cooperating portions of said sleeve and said box being provided with spherical surfaces, said sleeve being split transversely and provided with end flanges that overlap opposite sides of said link.

11. A locomotive running gear comprising a plurality of wheeled axles, driving boxes surrounding said axles between the wheels thereon, and links connecting the corresponding ends of said boxes, said links having large end portions provided with openings adapted to receive said boxes, each link having a portion thereof forming the box receiving opening hinged to facilitate assembly and disassembly of the links and boxes.

12. A locomotive running gear comprising a plurality of wheeled axles, driving boxes surrounding said axle between the wheels thereon, links connecting the corresponding ends of said boxes, said links having large end portions provided with openings adapted to receive said boxes, each link having a portion thereof forming the box receiving opening hinged to facilitate assembly and disassembly of the links and boxes, and means for locking said hinged portion in closed position.

JOEL HEKTNER.